Patented Nov. 11, 1924.

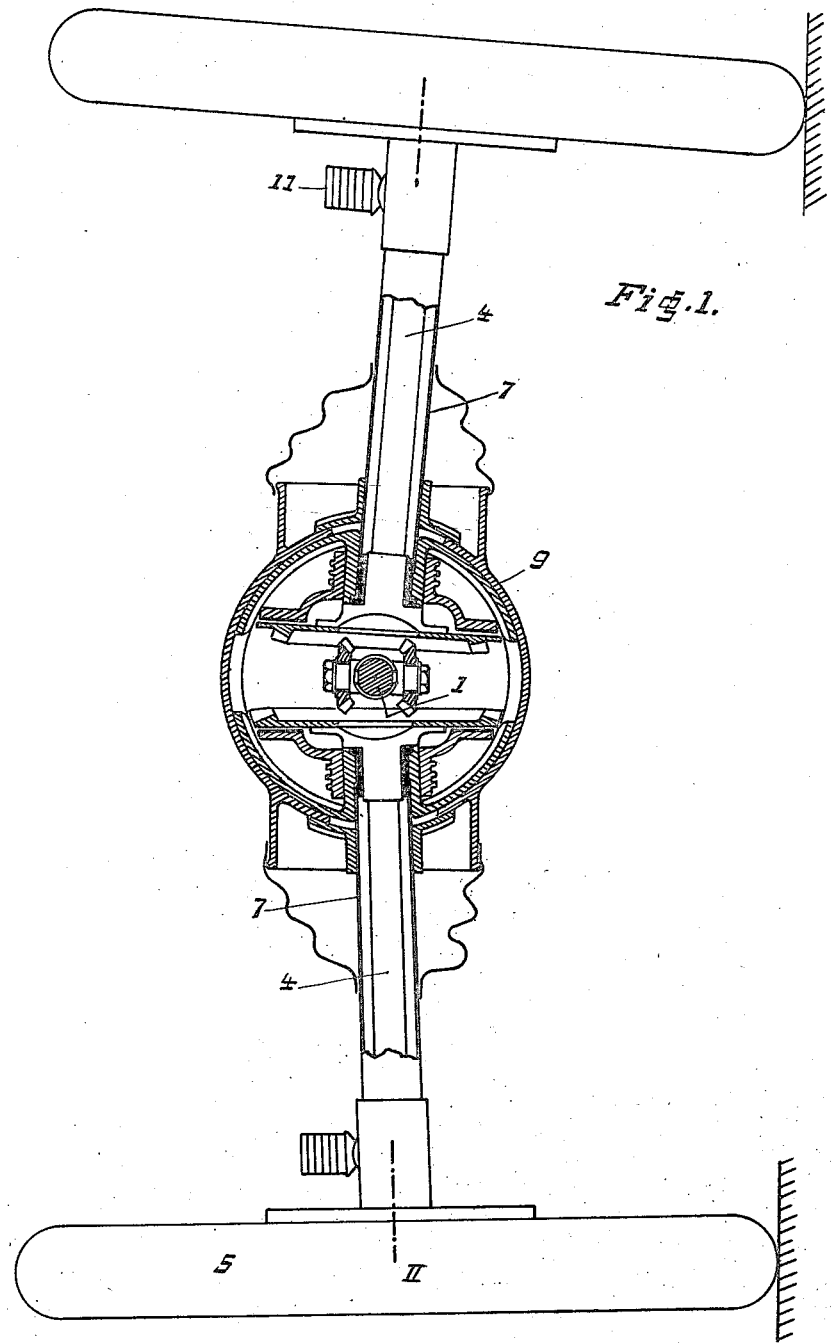

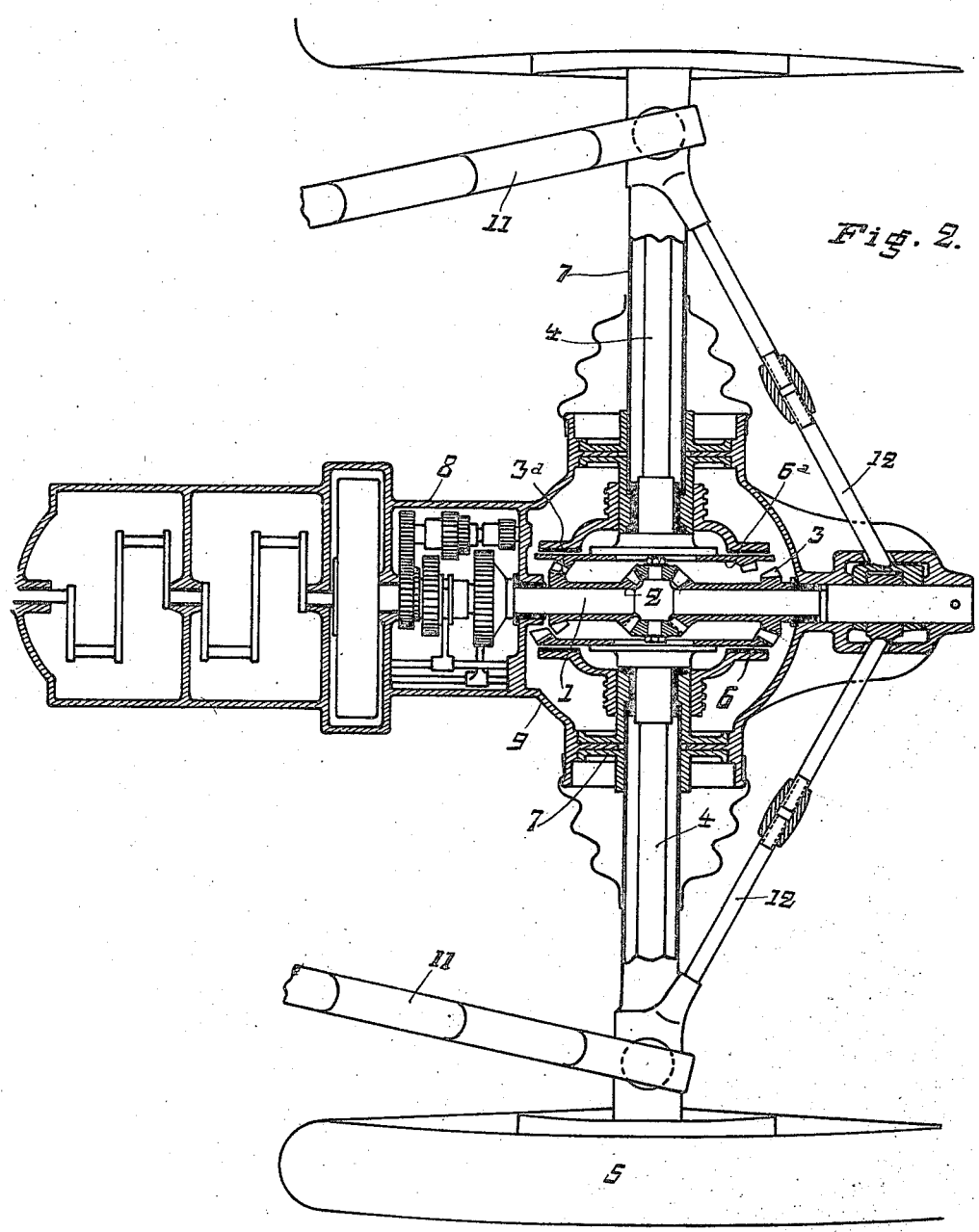

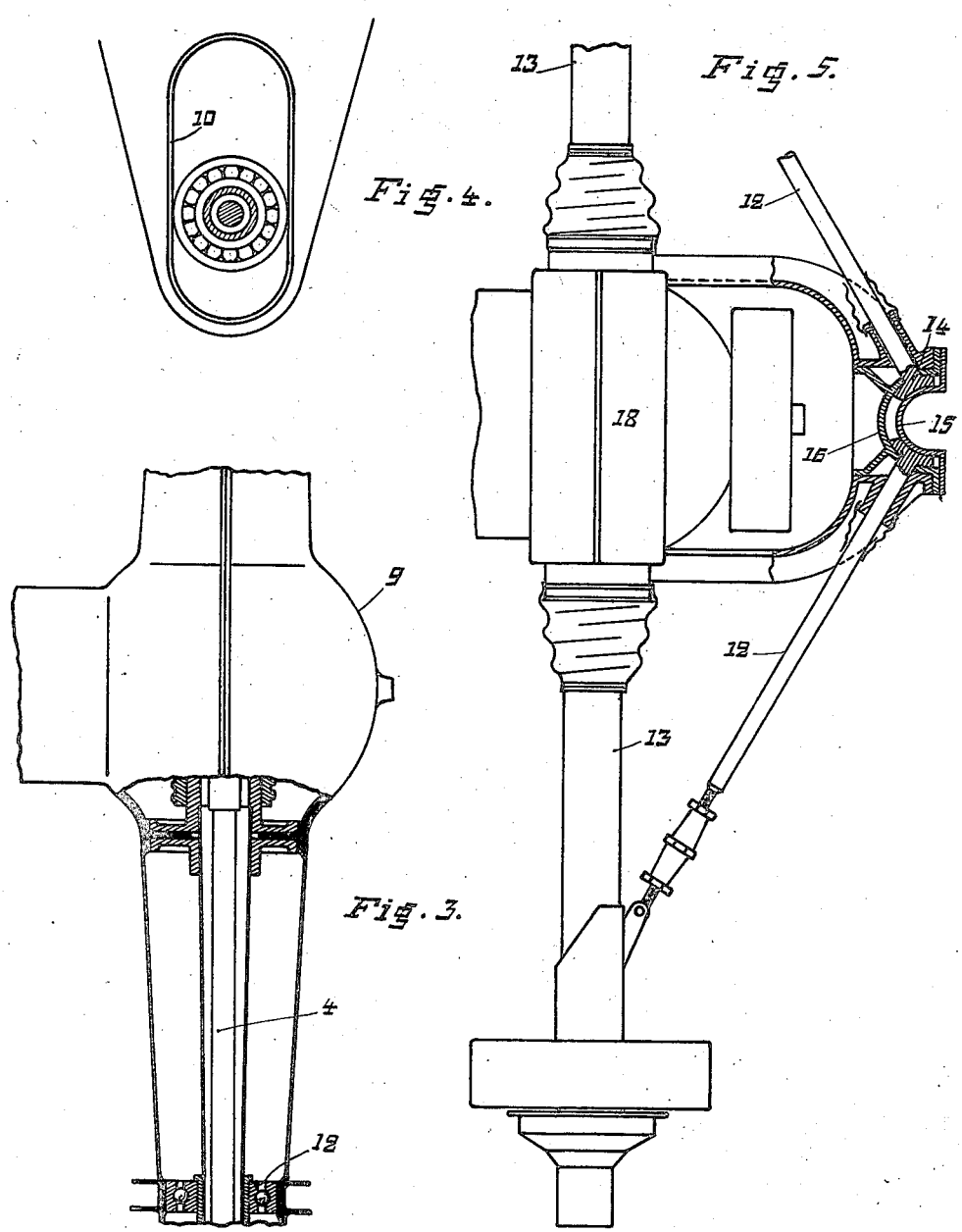

1,514,862

UNITED STATES PATENT OFFICE.

EDMUND RUMPLER, OF GOGGINGEN, GERMANY.

REAR-AXLE DRIVE FOR MOTOR VEHICLES.

Application filed March 26, 1921. Serial No. 455,857.

(GRANTED UNDER THE PROVISIONS OF THE ACT OF MARCH 3, 1921, 41 STAT. L., 1313.)

*To all whom it may concern:*

Be it known that I, EDMUND RUMPLER, a subject of the State of Germany, residing at Goggingen, Germany, have invented a certain new and useful Rear-Axle Drive for Motor Vehicles (for which I have filed applications in Germany March 11, 1915; December 31, 1917; September 19, 1919; April 14, 1920; February 13, 1920; Great Britain, July 12, 1920; Holland, July 29, 1920; Italy, July, 1920; Czechoslovakia, July, 1920; France, July, 1920; Belgium, July 10, 1920; and Spain, July, 1920), of which the following is a specification.

The invention relates to an arrangement for the driving of the rear axle of motor vehicles.

This invention consists essentially in the fact that a series of arrangements are combined for the purpose of avoiding the use of chains and Cardan joints, while ensuring for the mechanism an efficient suspension and complete protection from dust. For this purpose there are provided two half-axles, each carrying a driving wheel, and extending without interruption from the drive shaft to the wheel, these members of the axle pivoting around the main and common driving shaft which is disposed in the longitudinal direction of the vehicle. The differential gear is arranged at the common point of intersection of the axes of the two half-axles and of the driving shaft.

Two cylindrical tubes lying in the same plane perpendicular to the drive shaft and having pivotal motion about the same as common axis are provided to receive the half-axles.

The accompanying drawings show by way of example, a construction according to the invention:—

Figure 1 represents a vertical section of the rear axle with the suspension and other elements.

Figure 2 is a section on the line II—II of Figure 1.

Figure 3 is a plan view partly in horizontal section.

Figure 4 is a detail; and

Figure 5 is a plan view representing another construction.

1 indicates the longitudinal shaft extending directly or indirectly from the motor. On this shaft are mounted, on the one hand, the differential gear 2, and, on the other hand, two small bevel wheels 3, $3^a$. The rear axle is constructed of two half-axles 4 independent one of the other, and provided so that they may have a pivotal movement, these elements carrying at their outer extremities the wheels 5 of the vehicle and at their inner extremities the large bevel wheels 6 and $6^a$ which engage with the small bevel wheels 3 and $3^a$. Each half-axle is thus operated by a bevel gear 3, 6, and $3^a$, $6^a$ of which the members have the apex of their pitch surfaces situated on the pivotal axis of the half-axles, that is to say, in the shaft 1.

The arrangement of the driving wheels of the differential gear 2 on the longitudinal shaft 1 has the advantage that the pivotal movements of the elements of the axle do not occasion positive or negative accelerations in the mechanism, and that, on the contrary, these movements are directly equalized in the differential.

The half-axles are supported in cylindrical guides 7 which receive the torsion moments due to the reaction.

The present invention permits of the assemblage as a whole, in a most simple manner, of the casing 8 containing the change speed mechanism and the rear bridge or casing 9 containing the common mechanism of the rear axle, this whole comprising the mechanism which operates the two half-axles as well as the cylindrical guide members 7. The same body comprises, further, the slides 10 and the suspension springs 11 in such a manner that the complete assembly comprising the speed gear casing, the rear bridge with the elements of the axle, the guide elements and the suspension springs, can be mounted in the chassis of the vehicle without necessity for the separation of the elements.

Figure 2 shows that the assembly constituted by the change speed gear casing and the casing of the rear bridge and which includes the guide elements of the inner and outer extremities of the half-axles as well as the suspension springs, forms with the crank case of the motor a complete unit. This crank case is disposed in front of the change speed gear casing. In this manner the assemblage of all the elements along the same axis is considerably facilitated. Further, the mass of the suspended elements connected to the frame of the vehicle is thus considerable, while the mass of the elements which are not suspended, and which are subject to the effect of the unevenness of the ground (wheels and external members of the half-axles) is not modified. The forces of acceleration which act on the suspended elements and which correspond to the movements of contraction and extension of the springs of the vehicle, therefore, act upon great masses which can be set into movement, in such a manner that the amplitude of the movements, which are prejudicial to easy running, is diminished. The complete whole comprising the motor crank case, the change speed gear box, the rear bridge, the members serving to guide the inner and outer extremities of the half-axles, and the suspension springs can be mounted in a body in the chassis without being divided.

To transmit the thrust of the elements of the axle on the chassis, ball bearings or guide surfaces may be provided to act against the slides, in the form of a channel or slot, mounted on the chassis of the vehicle (Figure 4). This construction can be replaced by inclined struts which constitute with the tube enclosing the elements of the axle a rigid triangle which can pivot about the same axis as the elements of the axle. The sliding friction is transformed into friction of rotation, and, further, the very small movement which still exists is absorbed at a point which can be readily lubricated by the crank case lubricating system. The extremities of the struts 12, are of a cylindrical form to embrace the pivotal axis in the construction represented in Figure 2. This requires a high degree of accuracy in the construction at the point of junction. In place of this construction, the struts may be connected to the pivotal axis by a spherical joint, in such manner that the struts can freely take up their positions without being subjected to additional forces. It is consequently possible in the practical application of the invention to provide an efficient combination of the struts which does not require very precise mounting, and in addition, avoids difficult work in the workshops.

Figure 5 shows a suitable spherical construction. In this figure 12 represents the struts inclined forwardly and rearwardly. 13 the tubes of the axle carrying the rear wheels. 18, the casing enclosing the transmission elements of the driving mechanism. The extremities 14 of the struts 12 are at the exterior, and preferably also at the interior, of a spherical form, and are enclosed by the spherical cases 15 and 16 between which the spherical extremities can freely move and occupy positions corresponding to the forces exerted. In certain cases the spherical form may be utilized only for the internal surfaces, or only for the external surfaces of the assembly of struts. It will be understood that this quality of freedom of movement possessed by the struts renders the construction quite independent of the imperfections of work in the workshop.

The construction of the entire mechanism according to the invention, and in particular the disposition of the whole and the disposition of the struts, further permits the utilization as elements of the brake gear, of the existing two large bevel wheels, either directly or through the medium of brake discs. It was not possible to employ this braking system in the case of the large bevel wheels which were usually employed, up to the present, in the rear bridge with the ordinary Cardan joint, for this bevel wheel was not connected directly and rigidly to the driving wheel of the vehicle, the wheel of the differential being, actually, introduced between these elements. A braking system of this kind will not suffice, for it is necessary at the least that a brake shall act only on those parts which are directly and rigidly connected with the rear wheel of the vehicle. The arrangement according to the invention satisfies this condition. By reason of the arrangement of the brakes in the interior of the casing of the rear axle, the advantage is secured that the non-suspended masses carried directly by the wheel of the vehicle are considerably reduced, and it thus becomes more easy to arrange for the operation of the brakes, as they are no longer carried by the non-suspended parts, that is to say, the wheels of the vehicle, but on the contrary by the driving mechanism which is suspended.

The springs 11 rest upon and are supported by the axle casings 7 adjacent to the supporting wheels 5. The springs at their other ends are rigidly secured to and thereby support the main frame of the vehicle. This main frame has the motor and transmission casing rigid therewith. Therefore the transmission and differential are carried by the frame which is supported by the springs 11. Under normal load the arrangement of the parts is such that the angle between the axle sections is substantially that illustrated in Fig. 1. With an increase in load the springs may bend and the frame, together with the differential, may take a lower position.

I claim:

1. Rear wheel drive for motor vehicles, including in combination with a drive shaft extending longitudinally of the vehicle, two half-axles, supporting members in which the half-axles are free to revolve, a casing surrounding the drive shaft for housing the connection between the latter and the half-axles and means on the said casing and the supporting members for prescribing for the latter a limited circular path of movement about the drive shaft.

2. Construction according to claim 1 in which the means for prescribing the circular path includes cylindrical portions on the casing and the supporting members in sliding contact with each other.

3. Construction according to claim 1 in which the supporting members are tubular elements substantially co-extensive with the half-axles.

4. Rear wheel drive for motor vehicles, including in combination with a drive shaft extending longitudinally of the vehicle, two half-axles, tubular elements substantially co-extensive with the half-axles in which the latter are free to revolve, a casing surrounding the drive shaft for housing the connection between the latter and the half-axles, cylindrical portions on the casing and the tubular elements for prescribing for the latter a limited circular path of movement about the drive shaft and a flexible inclosure between the tubular elements and the casing for protecting the said cylindrical portions against dirt.

5. Arrangement according to claim 1 including means constructed and arranged to transmit the tractional thrust from the half-axles to the chassis of the vehicle while leaving the half-axles entirely free in their angular movement about the axis of the drive shaft.

6. Arrangement according to claim 1 including stays extending rearwardly from the outer ends of the half-axles and connected for pivotal movement about the axis of the drive shaft 7. Arrangement according to claim 1 including stays extending rearwardly from the outer ends of the half axles and a ball and socket joint for pivotally supporting the stays about the axis of the drive shaft.

8. In motor vehicles, the combination of a casing having a cylindrical wall and openings on diametrically opposite points in the cylindrical wall, bearings extending freely through said openings, and cylindrical flanges on the bearings having sliding contact with the inner and outer surface respectively of said cylindrical wall adjacent the openings, whereby the bearings are circularly movable about the axis of the cylindrical wall while maintaining an effective closure of the casing.

9. In motor vehicles, the combination of a crank case, gear shift case and differential gear case integrally connected to form a single structural unit, the said unit having a cylindrical wall portion for housing the differential gear mechanism and openings in opposite sides of the cylindrical housing, bearings extending freely through the openings and cylindrical flanges on the bearings having sliding contact with the inner and outer surface respectively of the cylindrical wall adjacent the openings.

EDMUND RUMPLER.